United States Patent
Stock et al.

(10) Patent No.: US 7,599,623 B2
(45) Date of Patent: Oct. 6, 2009

(54) APPARATUS AND METHOD OF MANAGING POTS LINES IN A PON NETWORK

(75) Inventors: John A. Stock, Petaluma, CA (US);
Douglas A. Atkinson, Ashburn, VA (US); Raul F. Fernandez, Miami, FL (US); Thomas E. Conklin, Leesburg, VA (US); Marc R. Bernard, Vienna, VA (US)

(73) Assignee: Tellabs Petaluma, Inc., Naperville, IL (US)

( * ) Notice: Subject to any disclaimer, the term of this patent is extended or adjusted under 35 U.S.C. 154(b) by 751 days.

(21) Appl. No.: 11/352,942

(22) Filed: Feb. 10, 2006

(65) Prior Publication Data

US 2007/0263782 A1    Nov. 15, 2007

(51) Int. Cl.
*H04J 14/00* (2006.01)
(52) U.S. Cl. .............................. 398/74; 398/67; 398/68; 398/72
(58) Field of Classification Search ..................... 398/9, 398/25–27, 33, 66, 67, 70–72, 74, 75, 168; 379/56.1, 56.2
See application file for complete search history.

(56) References Cited

U.S. PATENT DOCUMENTS

| | | | |
|---|---|---|---|
| 2002/0063924 A1* | 5/2002 | Kimbrough et al. | 359/125 |
| 2003/0236916 A1* | 12/2003 | Adcox et al. | 709/245 |
| 2004/0019258 A1 | 1/2004 | Kavounas et al. | |

* cited by examiner

*Primary Examiner*—Dalzid Singh
(74) *Attorney, Agent, or Firm*—Hamilton, Brook, Smith & Reynolds, P.C.

(57) ABSTRACT

An apparatus or corresponding method of managing Plain Old Telephone Service (POTS) lines in a Passive Optical Network (PON) to prevent an alarm system from generating an alarm during a software upgrade or maintenance of an Optical Network Terminal (ONT), Optical Line Terminal (OLT), or PON while maintaining the effectiveness of the alarm system. The ONT may store data related to a POTS line in nonvolatile memory. The ONT may activate the POTS line based on the data from the nonvolatile memory in an event of interruption in communications with an OLT prior to reestablishing communications with the OLT. The interruption in communications may be caused by an ONT reboot to complete an installation of a software upgrade. The ONT may energize the POTS line with a voltage in response to activating the POTS line to prevent the alarm system from generating the alarm.

33 Claims, 8 Drawing Sheets

US 7,599,623 B2

APPARATUS AND METHOD OF MANAGING POTS LINES IN A PON NETWORK

BACKGROUND OF THE INVENTION

In Fiber-To-The-Premises (FTTP) networks, software or hardware upgrades to or maintenance of Optical Network Terminals (ONTs) and Optical Line Terminals (OLTs) may cause brief interruptions in communications between the ONTs and OLTs. For example, in a software upgrade to the ONT, the ONT loses communication with the OLT during a reboot process used to initialize the ONT with the software upgrade. In some systems, these interruptions in communications, in turn, cause Plain Old Telephone System (POTS) lines of the ONTs to deactivate. An alarm system, such as a burglar alarm system, connected to the ONT via a POTS line may generate an alarm in response to detecting a deactivated POTS line.

SUMMARY OF THE INVENTION

A method in accordance with an embodiment of the present invention prevents an alarm system from generating an alarm during a software upgrade or maintenance of an ONT, OLT, or PON while, at the same time, maintaining the effectiveness of the alarm system. The method may include storing data related to a POTS line in memory connected to the ONT. The method may further include activating the POTS line based on the data from the memory in an event of interruption in communications between the ONT and OLT prior to reestablishing communications between the ONT and OLT.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
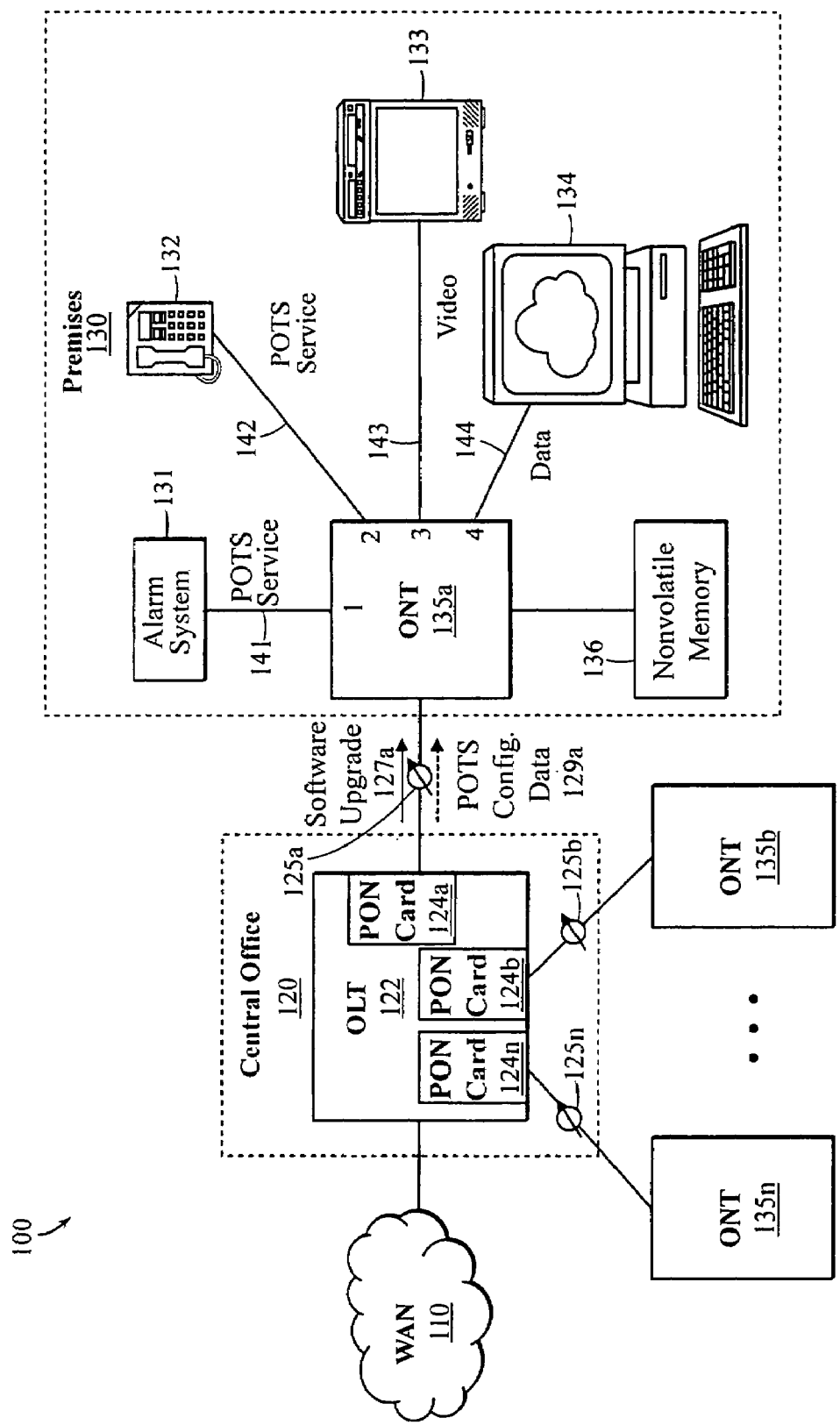
FIG. 1 is a network diagram of an optical communications system employing an embodiment of the present invention.

FIG. 1 is a network diagram of an example optical communications system 100 employing an embodiment of the present invention. The optical communications system 100 includes a central office 120 connected to a plurality of ONTs 135a, 135b, ... 135n via Passive Optical Networks (PON) communications links 125a, 125b, ..., 125n. As shown in FIG. 1, the PON communications links 125a, 125b, ..., 125n are deployed for Fiber-To-The-Home (FTTH) or Fiber-To-The-Premises (FTTP) applications. In other embodiments, the PON communications links 125a, 125b, ..., 125n may be deployed for Fiber-To-The-Business (FTTB) or Fiber-To-The-Curb (FTTC) applications.

The central office 120 includes an OLT 122 with multiple PON cards 124a, 124b, ..., 124n. Each PON card 124a, 124b, ..., 124n may connect to multiple ONTs, including respective ONTs 135a, 135b, ..., 135n. As described above, an ONT 135a may be deployed at a subscriber's premises 130. The example ONT 135a may support any number of Plain Old Telephone Service (POTS) lines. For example, the ONT 135a may support POTS service to a telephone device 132 via port 2 and a POTS line 142. The ONT 135a may also support POTS service to an alarm system 131, such as a home security system or any similar alarm system, via port 1 and a POTS line 141. In other embodiments, the alarm system 131 may share POTS line 142 with the telephone device 132. The ONT 135a may further support video services (e.g., RF Video) and data services (LAN Data) to a television 133 and a computer 134, respectively, via respective dedicated ports 3 and 4 designed for these services. The OLT 122 in the central office 120 also connects to a Wide Area Network (WAN) 110.

In prior art communications systems, a subscriber's premises connected directly to a central office through POTS lines. The POTS lines are configured as Tip and Ring lines with a differential 48 volt output. Home security systems are connected to the POTS lines in order to automatically alert law enforcement agencies of a break-in. The home security systems are designed to detect the differential 48 volts on the POTS line so that the home security system can know whether or not a burglar had disabled communications by cutting the POTS lines.

The home security systems are further designed to trigger an alarm after detecting either a loss of voltage or a short in the POTS line. The home security systems use a timer to ride out momentary service disruptions. The length of the timer could be different for the loss of voltage and the short in the POTS lines. For example, the timer for the short could be quicker than for the loss of voltage.

With the deployment of ONTs in FTTP and FTTB applications, however, the ONTs 135a, 135b, ..., 135n, instead of the central office 120, provide POTS service. Often the ONT 135a or the OLT 122 is upgraded with new software. In order to activate new software on either the OLT 122 or ONT 135a, the OLT 122 or ONT 135a must reboot. If the ONT reboot causes a loss of the differential 48 volts to the alarm system 131 (e.g., a home security system) for more than a short time window, such as seven seconds, then the alarm system 131 determines that the POTS line has been cut and sounds an alarm. When a PON card 124a is upgraded with new software, it too must reboot to activate the new software. The PON card reboot causes a loss of communications between it and the ONT(s) and may further cause the ONT(s) to reboot.

According to an embodiment of the present invention, the subscriber's premises 130 include nonvolatile memory 136 connected to or integral with the ONT 135a. The nonvolatile memory 136, such as FLASH memory, may store information indicating whether or not ports 1 and 2 are enabled. When the ONT 135a reboots, ports 1 and 2 immediately output a differential 48 volts within a time window, such as a seven second window. This prevents the alarm system from issuing a false alarm. However, if a burglar cuts a fiber in the PON communications link 125a, ports 1 and 2 maintain the differential 48 volt output and the alarm system 131 does not issue an alarm.

Figure 2:
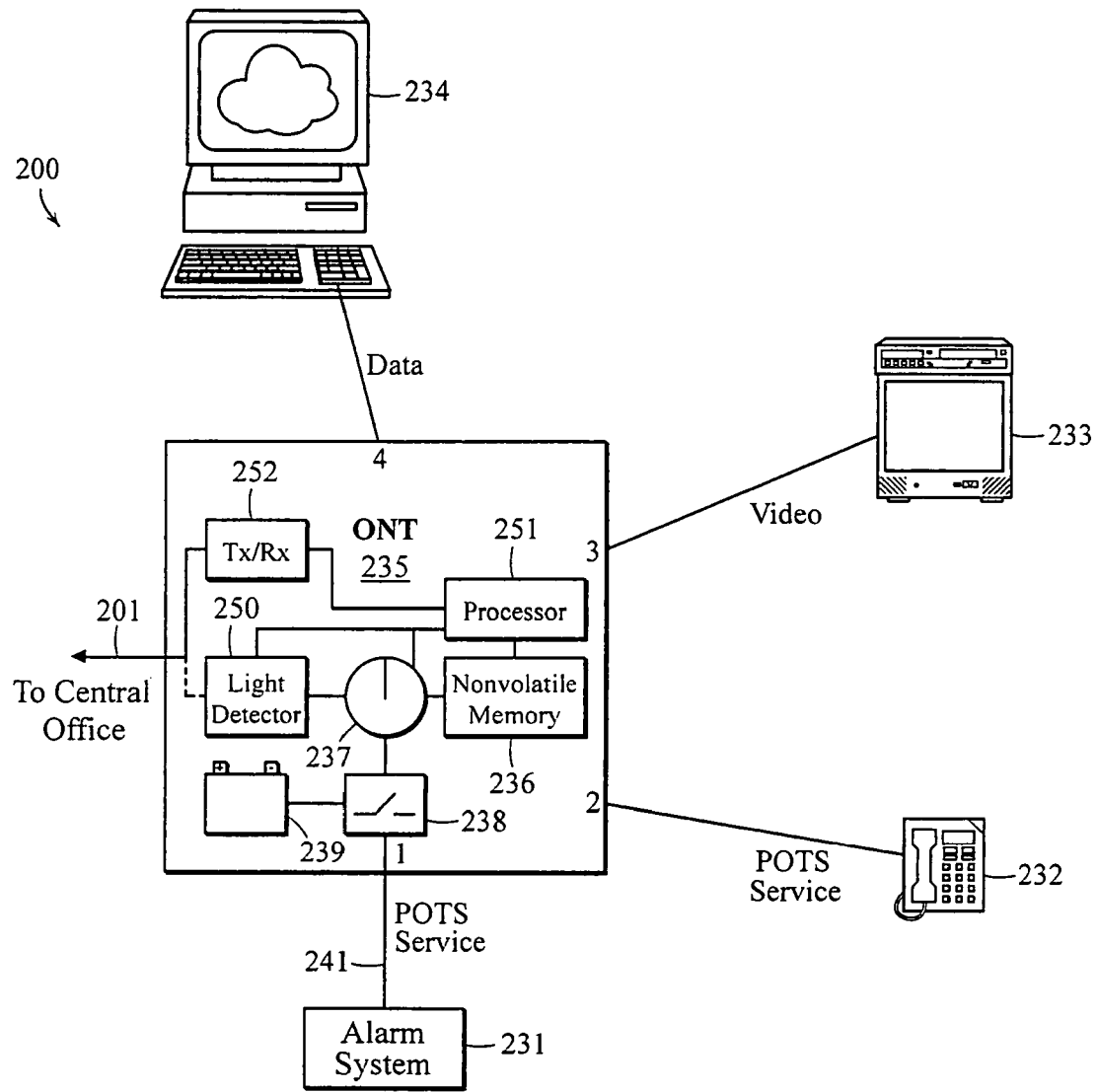
FIG. 2 is a network diagram of a portion of the optical communications system of FIG. 1 employing an embodiment of the present invention.

FIG. 2 is a network diagram of a portion 200 of the optical communications system 100 of FIG. 1 employing embodiments of the present invention. In one embodiment, an ONT 235 includes a timer 237. In some embodiments, when the ONT 235 loses communications with an OLT (122) at a Central Office (120) (FIG. 1) through an optical fiber 201, the ONT processor 251: (1) reboots, (2) starts the timer 237, and (3) maintains a differential voltage on a POTS line 241 supporting an alarm system 231. In other embodiments, the ONT processor 251 may not reboot when the ONT 253 loses communications with the OLT (122), but the POTS line may be treated in a manner disclosed herein to prevent the alarm system from generating an alarm. The differential voltage on the POTS line 241 may be maintained by closing a switch 238 connected between a POTS line power source 239, such as an integrated power-supply unit or a battery, and the POTS line 241.

The timer 237 may operate according to a timer value, such as two minutes, defining a time window within which the software upgrade or maintenance of the ONT 235, OLT (122), or PON communications link (125a) is to be completed. Maintenance of the PON communications link (125a) may include cleaning optical connectors or moving connections at an optical splitter. If the ONT 235 regains communications with the OLT (122) within the time window, the timer 237 retains the switch 238 closed so that the POTS line power source continues to provide power to the alarm system 231. In this manner, an ONT or OLT reboot or a planned interruption in communications do not cause the alarm system 231 to issue a false alarm.

If, however, the ONT 235 does not regain communications with the OLT (122) within the time window (possibly indicating that the optical fiber 201 has been severed), the timer 237 may cause the switch 238 to open in order to remove power from the alarm system 231 and allow the alarm system 231 to issue an alarm.

The timer 237 may be a configurable timer that may be configured by a user through the ONT processor 251. The timer 237 may be configured with any time value, for example, any time value from zero to six minutes in ten second increments. The OLT (122) may also provision the ONT 235 with a timer value, which the ONT may store in nonvolatile memory 236. Thus, if the ONT reboots, such as during an upgrade of the ONT's 235 software, then the ONT 235 may use the user-configured or provisioned timer value rather than a default timer value, such as two minutes.

The example ONT 235 may also include a light detector 250 which detects light, such as an optical communications signal, on the optical fiber 201. The ONT 235 may further include a transceiver 252 for sending and receiving optical communications signals between the OLT (122) and the ONT 235. In this embodiment, if the ONT 235 loses communications with the OLT (122), the ONT 235 detects at the light detector 250 whether or not it has lost a received optical communications signals. In the case where the OLT (122) receives software upgrades, the OLT (122) (or PON card 124a) reboots, but keeps its optical transmitter running. As a result, the light detector 250 continues to detect an optical communication signal.

If the optical fiber 201 is cut, the light detector 250 senses a loss of an optical communications signal and starts the timer 237. Logic (not shown) may be coupled to the light detector 250 and timer 237 to cause the timer 237 to start in event of loss of light on the optical fiber 201. When the timer 237 exceeds a default or user-configured timer value, the switch 238 opens to cause the alarm system to issue an electronic representation of an alarm (e.g., via a wireless network path) or sound an audible alarm.

If the ONT 235 reboots, the light detector 250 may not detect an optical communications signal from the OLT (122). In this case, the light detector 250 may activate the timer 237. The timer 237 preferably provides sufficient time for the ONT to regain communications with the OLT (122) so that the timer does not open the switch 238 to cause the alarm system 231 to sound an alarm.

In another embodiment of the present invention, the ONT 235 may include two timers configured by the user. For example, the first timer may be associated with the light detector 250 and may be activated by the loss of an optical communications signal, and the second timer may be associated with the transceiver 252 and may be activated when the transceiver 252 loses communications with the OLT (122). The first timer associated with the loss of an optical communication signal may be configured with a timer value shorter than the second timer associated with the loss of communications with the OLT (122). For example, the first timer associated with the loss of an optical communications signal may use a ten second timer value, and the second timer associated with the loss of communications may use a five minute timer value. The ONT 235 uses one of these two timer values depending on whether a loss of the optical communications signal or the loss of communications with the OLT (122) is encountered. Thus, an embodiment using a light detector 250 provides a way to more quickly sound an alarm if a burglar cuts the optical fiber 201 by actually sensing the optical communications signal on the optical fiber 201.

In yet another embodiment, the timer 237 may be automatically configured with another timer value during an upgrade. A user may configure the timer 237 associated with the light detector 250 with a short time window, such as ten seconds or thirty seconds. When the software upgrades are performed on the OLT or the ONT, the OLT may send a special message to the ONT to inform it that an upgrade is in progress. In this case, the message may indicate that the timer value is configured with a longer time window, such as two minutes. In this way, the ONT 235 knows that if it loses communication with the OLT or if the ONT reboots, it is most likely because of a software upgrade or other scheduled maintenance event (e.g., fiber plant service) and not because the optical fiber 201 has been severed.

After the software upgrade, the timer may revert back to the timer value associated with the light detector 250. Likewise, if a PON card at the OLT needs to be replaced, the OLT may send a message to the ONT informing it to configure the timer with a timer value sufficient to allow the PON card to be replaced. For example, the time value may be set to five minutes and then revert back to a shorter time window, such as two minutes, after the PON card is replaced.

Figure 3:
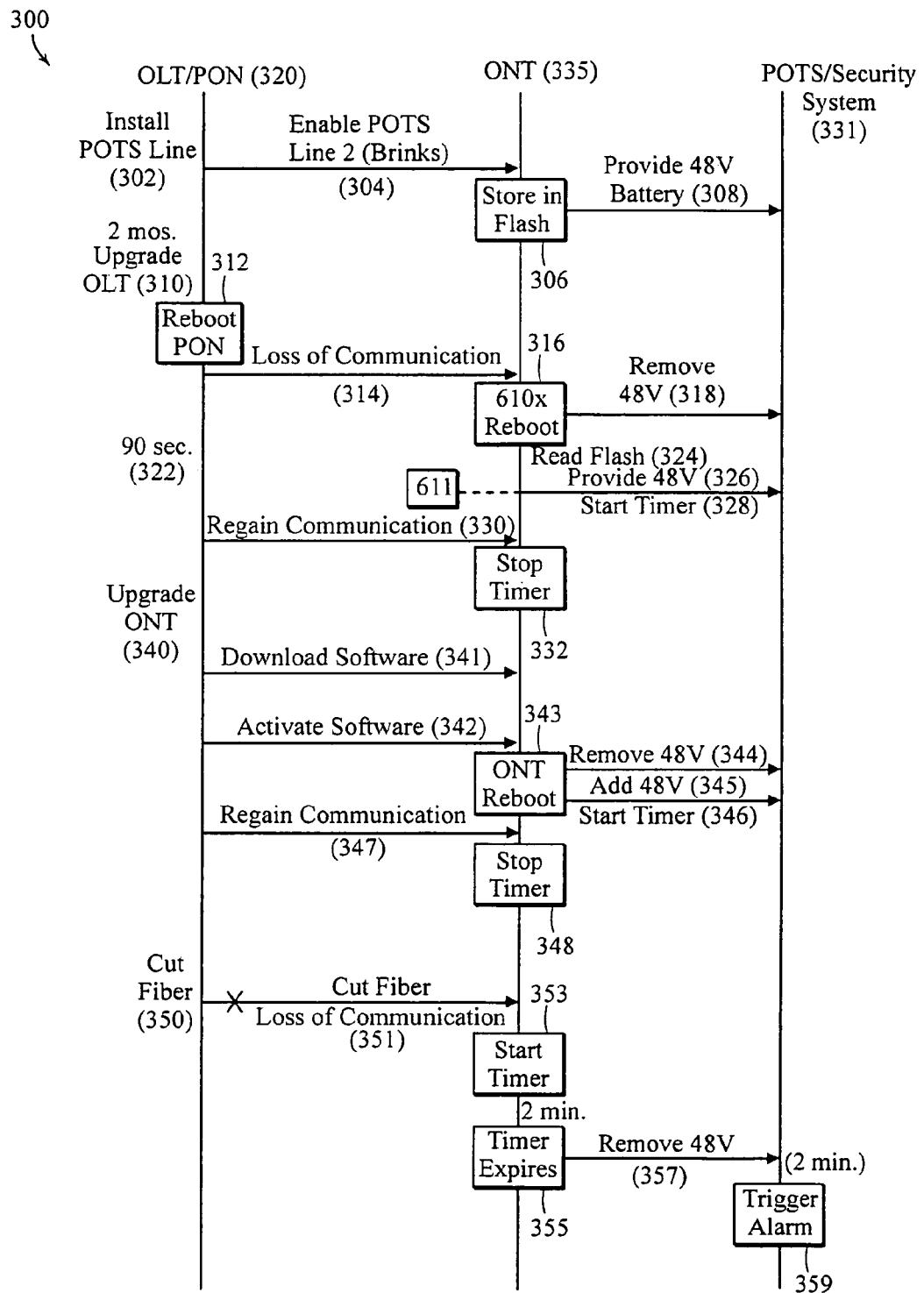
FIGS. 3-8 are example flow diagrams performed by elements of the optical communications system of FIG. 1.

FIG. 3 is an example flow diagram that may be performed by elements of the optical communication system of FIG. 1. After a service provider installs a POTS line (302), such as a POTS line supporting a security system 331, a second PON system, such an OLT 320, sends a message to a first PON system, such as an ONT 335, to enable the POTS line (304). The ONT 335 may store a value in FLASH memory (306), indicating that the POTS line has been enabled by the OLT 320. The ONT 335 then provides a differential 48 volts through a power source (308) to the POTS line and security system 331.

After a period of time, such as two months, the OLT software may be upgraded (310), which causes the PON card to reboot (312). As a result, the OLT (320) loses communications (314) with the ONT 335, and the ONT 335 reboots (316) and removes the differential 48 volts (318) from the security system 331. The ONT 335 reads from FLASH memory (324), determines that the POTS line is enabled, provides the differential 48 volts (326) to the security system 331, and starts the timer (328). If, for example, the timer is configured with a timer value of two minutes and the OLT 320 regains communications (330) with the ONT 335 after ninety (90) seconds (322), then the ONT 335 stops the timer 332.

If, after a period of time, such as a few months, the ONT software is upgraded (340), the OLT 320 downloads software (341) and activates the software (342) by rebooting the ONT (343). The ONT reboot (343) causes the ONT (335) to remove the differential 48 volts (344) on the POTS line. Within a short time frame of, for example, seven seconds, the ONT 335 provides the differential 48 volts (345) to the security system 331 and starts the timer (346). If the ONT 335 regains communications (347) with the OLT 320 before the timer exceeds the timer value, the ONT 335 stops the timer (348). In the case where the optical fiber is cut (350), the ONT 335 loses communications (351) with the OLT 320. When the ONT 335 determines that it has lost communications with the OLT, it starts the timer (353). When the timer expires (355) (after the timer exceeds a timer value, such as two minutes), the ONT 335 removes the differential 48 volts (357) from the security system 331. After the security system 331 detects a loss of power from the ONT 335, it triggers an alarm (359).

In the general field of POTS line technology, the term "activating" is often understood to mean that a service provider has enabled a POTS line by associating a telephone number with the POTS line. From the perspective of the service provider, the POTS line is always activated once the telephone number has been assigned to it. However, with respect to the present invention, the term "activating" refers to enabling, energizing or configuring, depending on the embodiment, the POTS line (i.e., a port associated with the POTS line) based on data stored in memory, in some embodiments, prior to reestablishing communications between PON systems on either side of the POTS line. For example, activating the POTS line may include energizing the POTS line with a voltage based on the data or may include applying configuration data associated with a port connected to the POTS line.

Figure 4:
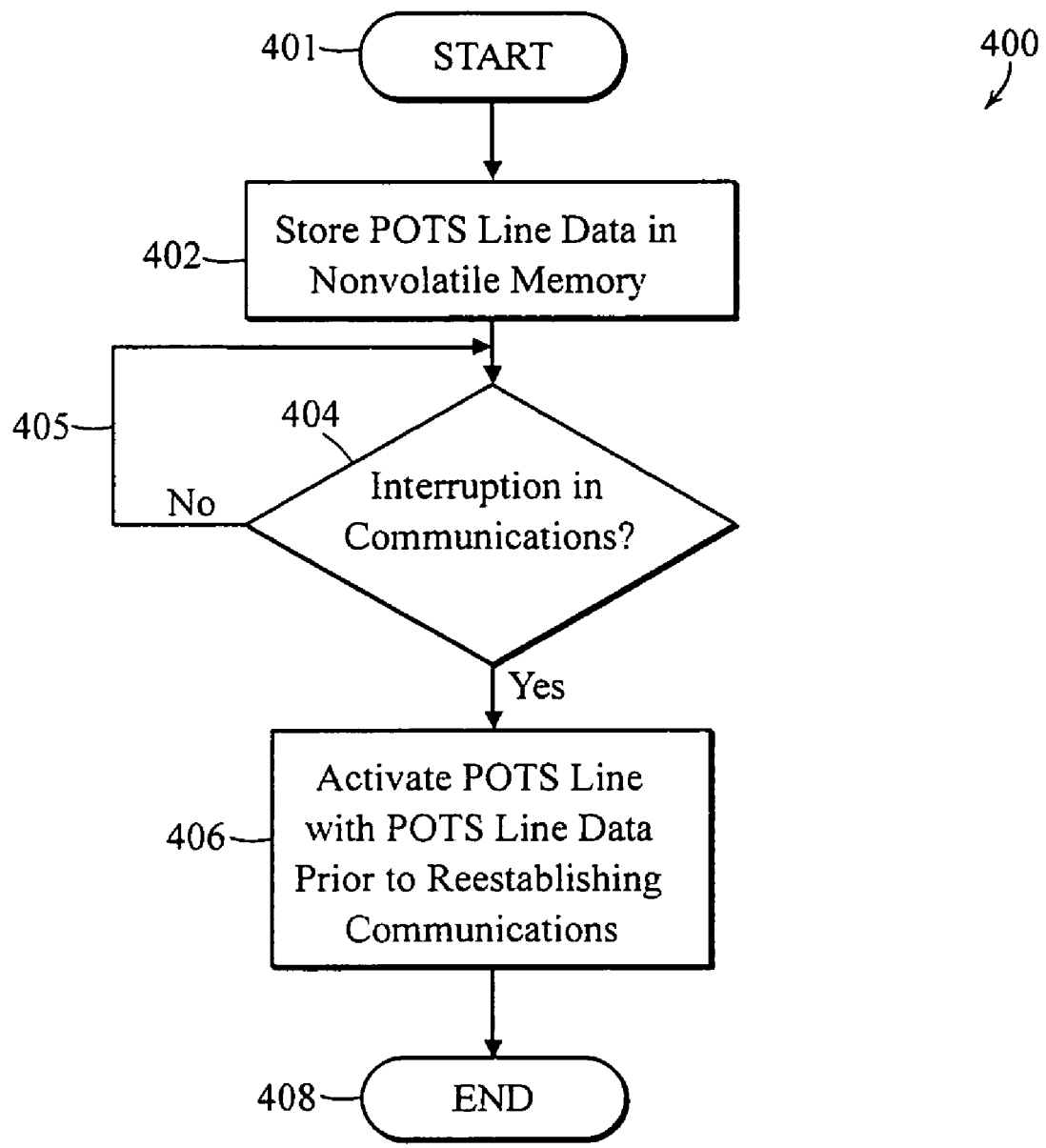

FIG. 4 is an example flow diagram performed by elements of an optical communications system, such as the optical communications system of FIG. 1. After starting (401), an ONT stores POTS line data in nonvolatile memory (402). The POTS line data may include configuration data, timer values, or a parameter or other representation indicating whether a POTS line is enabled. The ONT may then monitor for an interruption in communications (404, 405) between an OLT and the ONT. If the ONT detects an interruption in communications, the ONT activates the POTS line with the POTS line data prior to reestablishing communications with the OLT (406). Finally, the foregoing ONT process ends (408).

There may be embodiments where the POTS line data can be stored in RAM and not need to be loaded from nonvolatile memory. In other embodiments, the POTS line data can be stored in nonvolatile memory and loaded into RAM. Thus, in the event of interruption in communications between the ONT and OLT, the ONT can activate the POTS line based on data from nonvolatile memory or RAM.

Figure 5:
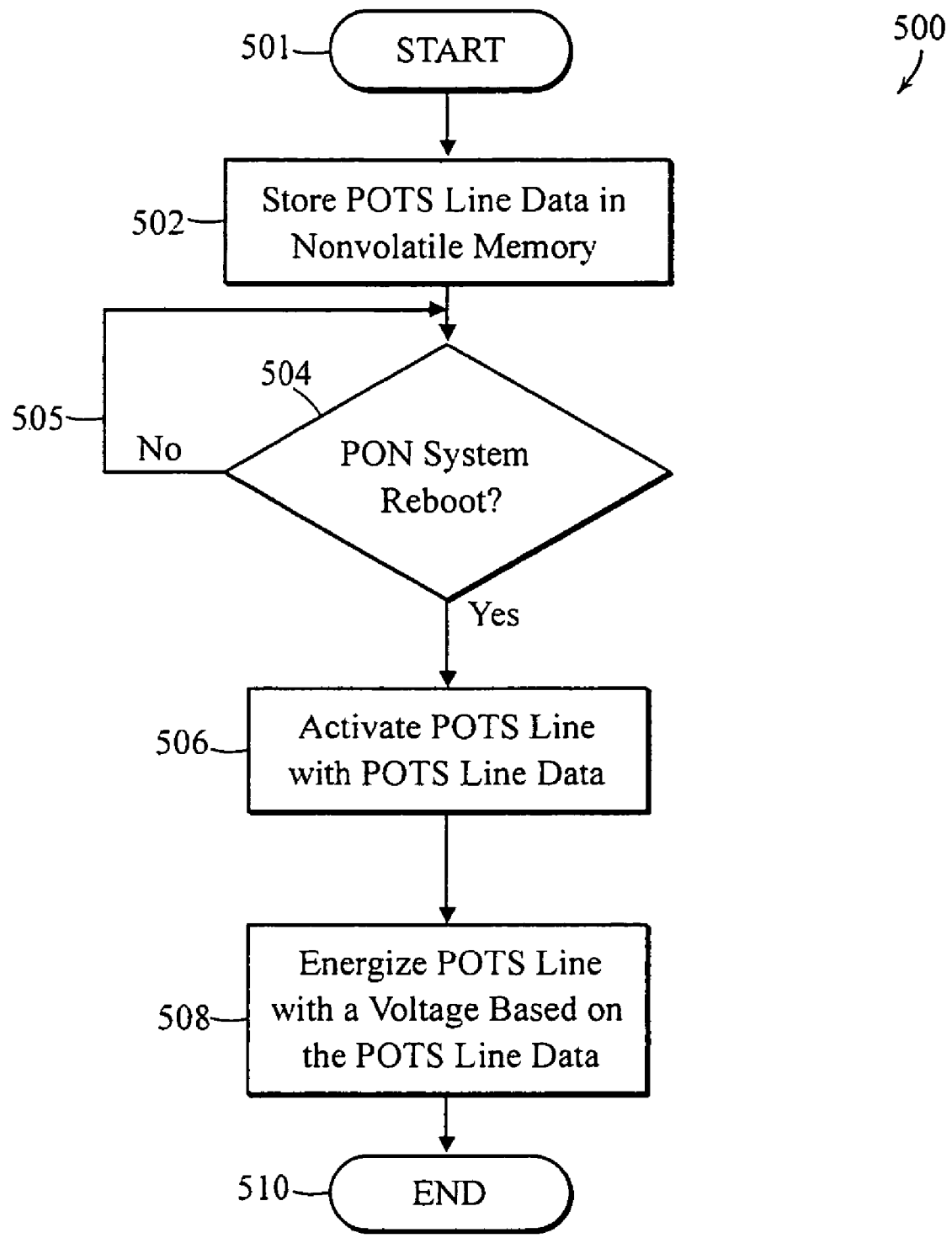

FIG. 5 is another example flow diagram of an example process 500 performed by elements of the optical communication system of FIG. 1. After starting (501), an ONT stores POTS line data in nonvolatile memory (502). The ONT proceeds to determine whether the PON system has rebooted (504). If not, the ONT continues to determine whether the PON system has rebooted (505). If the ONT determines that the PON system has rebooted, the ONT activates the POTS line with POTS line data (506) and energizes the POTS line with a voltage based on the POTS line data (509) prior to reestablishing communications with the OLT. The ONT may energize the POTS line with a voltage to prevent an alarm system connected to the POTS line from generating an alarm. Then, the foregoing ONT process ends (510).

Figure 6:
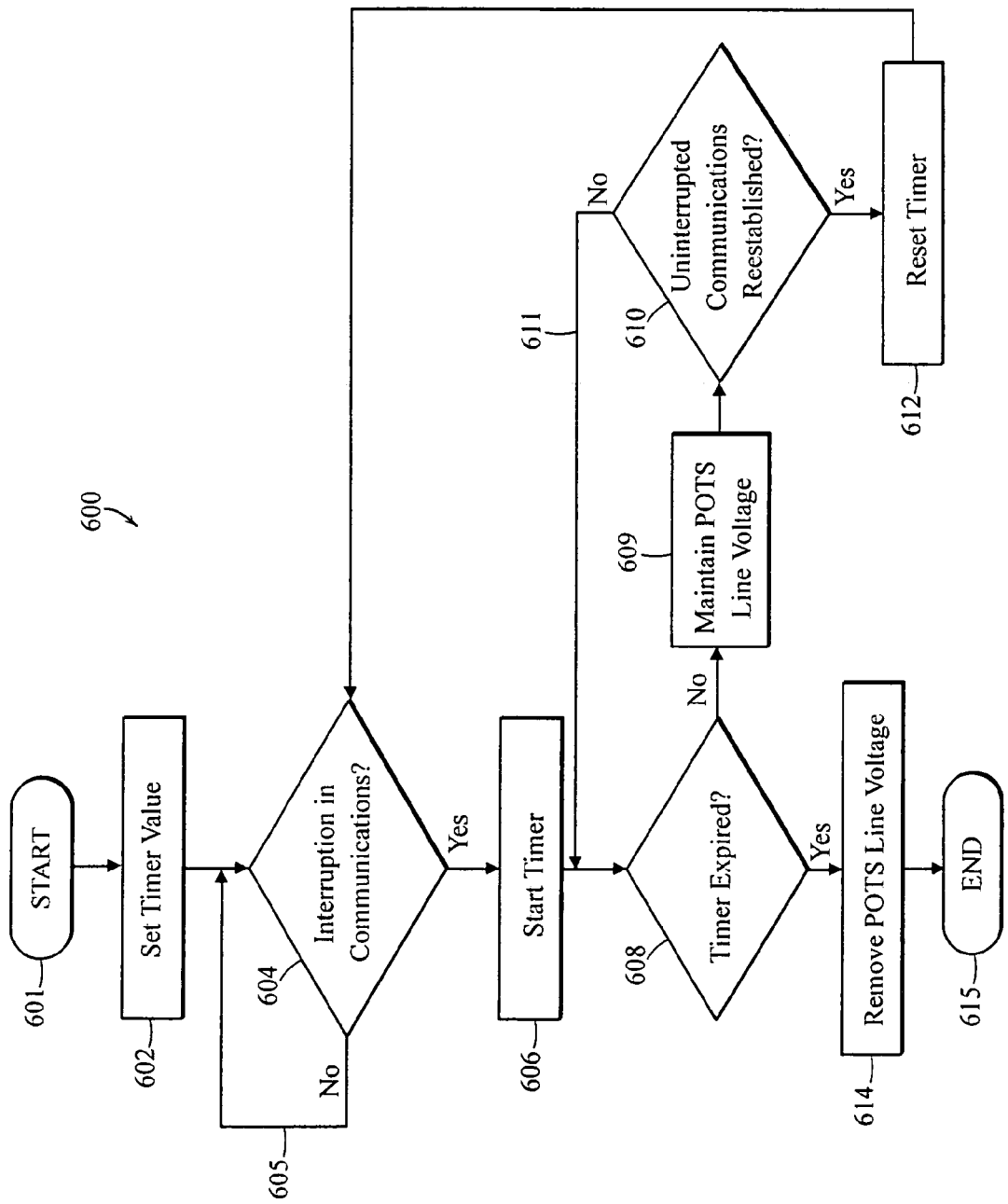

FIG. 6 is another example flow diagram performed by elements of the optical communications system of FIG. 1. After starting (601), a user sets a timer value (602) for a timer. The timer value may be a value known to be sufficient to allow an ONT to reestablish communications with an OLT, but not so long as to ineffectuate an alarm system connected to the ONT via a POTS line. For example, the timer value may be a fixed value between about one and a half and three minutes. The ONT may then proceed to monitor for an interruption in communications (604). If the ONT detects an interruption in communications between the ONT and the OLT (605), the ONT starts the timer (606). If there is no interruption in communications, the ONT continues to monitor for an interruption in communications. (605).

The ONT may next determine whether the timer has expired (608). If the timer has not expired (608), the ONT maintains a POTS line voltage (609) and proceeds to determine whether uninterrupted communications have been reestablished (610). If uninterrupted communications have been reestablished, the ONT continues to determine whether the ONT has expired (611). When uninterrupted communications are reestablished, the ONT resets the timer (612) and resumes monitoring for an interruption in communications (604). If the timer has expired (608), the ONT removes the POTS line voltage(614) and ends the preceding process (615) by removing the POTS line voltage. An alarm system, such as a home security system, connected to the POTS line may then sound an alarm.

Figure 7:
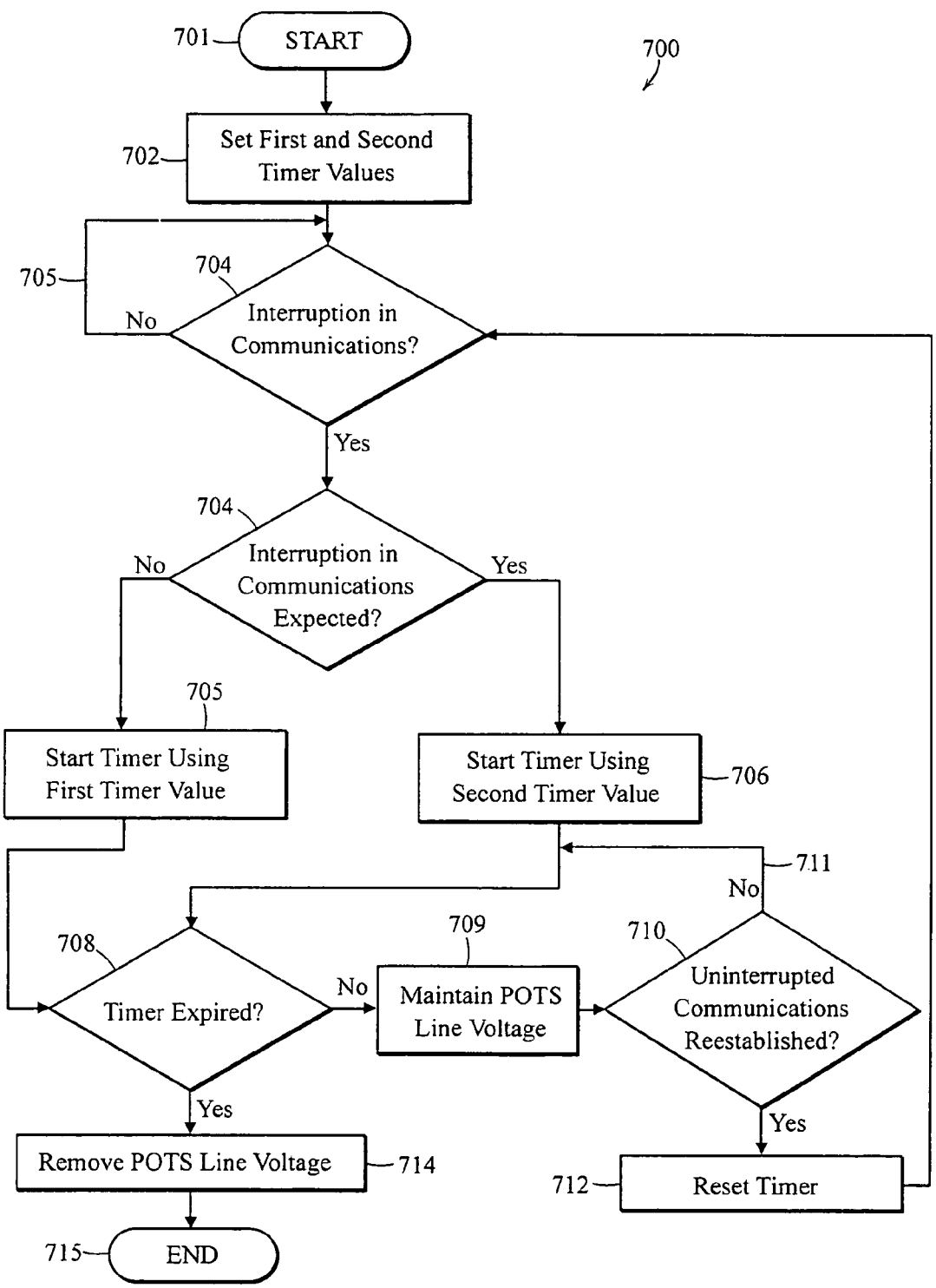

FIG. 7 is another example flow diagram that may be performed by elements of, for example, the optical communications system of FIG. 1. After starting (701), an ONT sets first and second timer values (702). These timer values may be stored in nonvolatile memory in the ONT. The ONT may then monitor for an interruption in communications with an OLT (704). If the ONT detects an interruption in communications with the OLT, the ONT proceeds to determine whether an interruption in communications is expected (704). For example, the ONT may determine whether an interruption due to a software upgrade or other maintenance activities has been scheduled.

If an interruption in communications is expected, the ONT may start the timer using the second timer value. If an interruption in communications is not expected (704), the ONT starts the timer using the first timer value (705). Whether or not the ONT has started the timer using the first or second timer values, the ONT determines whether the timer has expired (708). If the timer has not expired, the ONT (709) maintains the POTS line voltage and proceeds to determine whether uninterrupted communications have been reestablished (710).

If uninterrupted communications have not been reestablished, the ONT continues to determine whether the timer has expired (711). If uninterrupted communications have been established, the ONT resets the timer (712) and returns to monitor whether there has been an interruption in communications between the ONT and the OLT. If there has been no interruption in communications between the ONT and the OLT, the ONT continues to monitor for an interruption in communications (705). If the timer value has expired, the ONT removes the POTS line voltage (714) and ends the above process (715).

Figure 8:
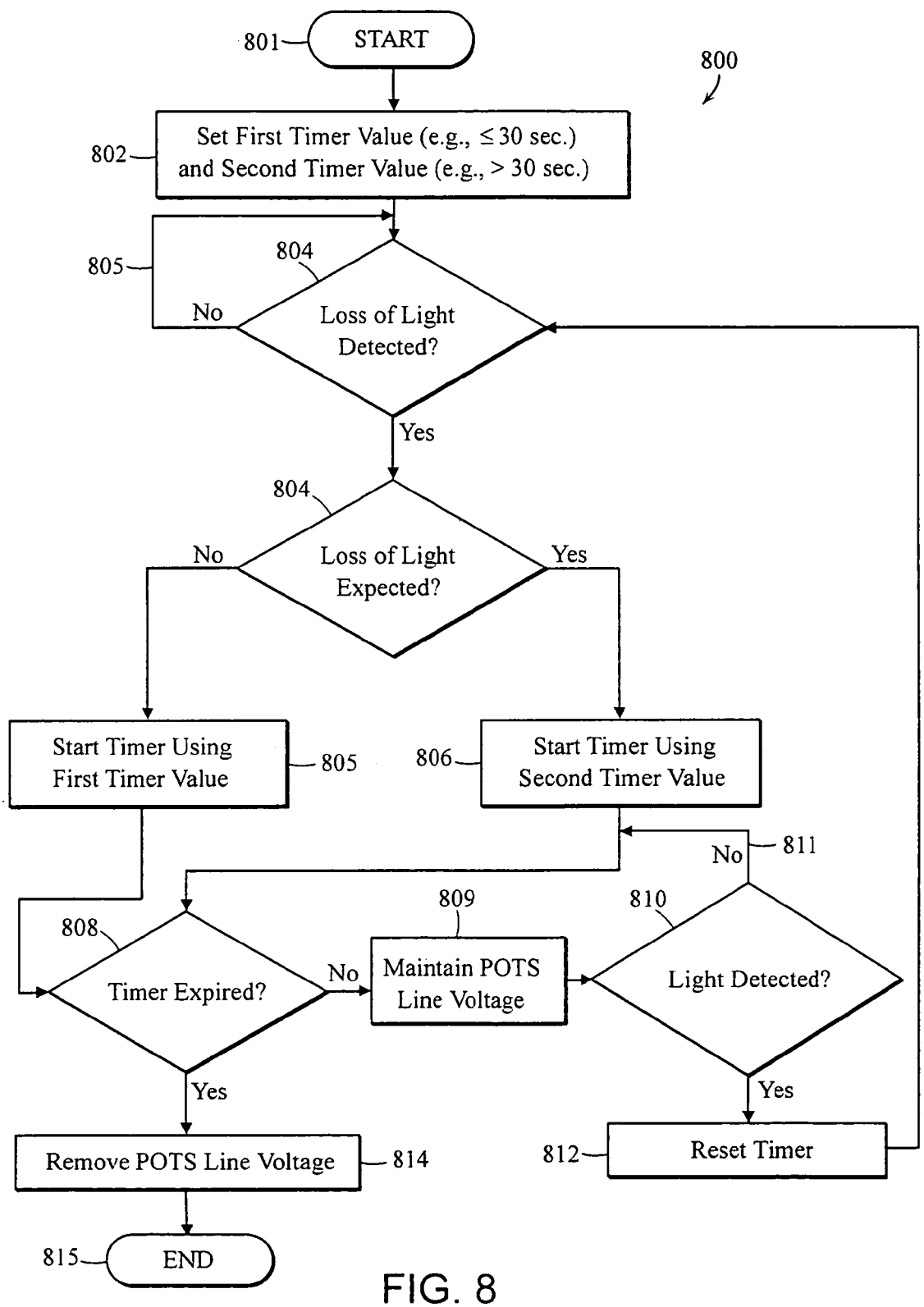

FIG. 8 is another example flow diagram that may be performed by components of the optical communications system of FIG. 1. After starting (801), an ONT sets a first timer value, such as less than or equal to 30 seconds, and a second timer value such as greater than 30 seconds (802). The ONT may then monitor for the loss of light on the fiber connecting the ONT to an OLT or a PON card (804). If the ONT has not detected a loss of light on the fiber, the ONT continues to monitor for a loss of light on the fiber (805). If the ONT detects loss of light on the fiber, the ONT next detects whether the loss of light is expected (804). If the loss of light is not expected, the ONT starts a timer using the first timer value (805). If the loss of light is expected, the ONT starts the timer using the second value (806).

The ONT may next determine whether the timer has expired (808). If the timer has not expired, the ONT maintains the POTS line voltage (809) and determines whether light has once again been detected (810). If light has not been detected (811), the ONT continues to determine whether the timer has expired (808). If light has been detected, the ONT returns to monitor for the loss of light on the fiber. If the timer has expired (808), then the ONT removes the POTS line voltage (814) and ends the above process (815).

The POTS line data may include configuration data used to configure the POTS lines to operate as loop start or ground start on a per POTS line basis. For businesses or other commercial facilities, ONTs may use ground start. Non-businesses or other non-commercial facilities generally use loop start. When the POTS lines operate as loop start, the tip and ring are shorted and a current is detected in the loop. Tip and ring are wires used in a typical POTS line. Thus, an ONT may energize a POTS line operating as loop start (e.g., provide loop current feed by grounding the tip and applying a POTS line power source to the ring on a loop start port) as soon as possible after initialization of a software upgrade to prevent an alarm system connected to the POTS line from generating an alarm. On the other hand, when the POTS lines operate as ground start, the tip is grounded and a current is detected. Energizing a POTS line operating as ground start, however, indicates an incoming call. Thus, a POTS line operating as ground start may not be used to prevent an alarm system connected to the POTS line from generating an alarm in accordance with principles of the present invention.

By including configuration data, used to configure the POTS line to operate as loop start or ground start on a per POTS line basis, the ONT can be activated with the applicable configured POTS analog interface on a per POTS line basis when the ONT reboots. In this manner, the configuration data is not lost through a reboot.

It should be understood that the OLT and ONT may communicate using Broadband PON (BPON) or a Gigabit PON (GPON) protocols. It should also be understood that the OLT may be configured to transmit Operations, Maintenance, and Control Interface (OMCI) data to the ONT. The OMCI data may include timer values and settings for the method of seizing the POTS lines (e.g., loop start or ground start).

While this invention has been particularly shown and described with references to preferred embodiments thereof, it will be understood by those skilled in the art that various changes in form and details may be made therein without departing from the scope of the invention encompassed by the appended claims.

For example, the flow diagrams of FIGS. 3-8 may include a subset of the flow diagrams, a different order of the flow diagrams, additional sections of the flow diagrams, and so forth, on a per application basis. The flow diagrams may be implemented in hardware, firmware, or software. If software, the software may be stored locally or remotely on a machine-readable medium, loaded (locally or via a network communications path), and executed by a general purpose or application-specific processor.

What is claimed is:

1. A method of managing Plain Old Telephone Service (POTS) lines in a Passive Optical Network (PON), the method comprising:
   storing data related to a POTS line in memory in a first PON system; and
   activating the POTS line based on the data from the memory in an event of interruption in communications between the first PON system and a second PON system prior to reestablishing communications between the first PON system and the second PON system.

2. The method according to claim 1 further including energizing the POTS line with a voltage based on the data prior to reestablishing communications between the first PON system and the second PON system in response to activating the POTS line, wherein energizing the POTS line based on the data prior to reestablishing communications prevents an alarm system coupled to the POTS line from generating an alarm.

3. The method according to claim 1 further including rebooting the first PON system, including the POTS line and memory, the rebooting causing the interruption in communications between the first PON system and the second PON system.

4. The method according to claim 3 wherein rebooting the first PON system includes upgrading software in the first PON system or the second PON system.

5. The method according to claim 1 wherein the data includes configuration data used to configure the POTS lines to operate as loop start or ground start on a per POTS line basis, and further including activating the applicable configured POTS analog interface on a per POTS line basis.

6. The method according to claim 1 further including:
   setting a timer value in the data that specifies a length of time the first PON system maintains a line voltage on the POTS line during the interruption in communications with the second PON system, including during an interruption caused by a reboot of the second PON system;
   triggering a timer in an event of interruption in communications between the first PON system and the second PON system; and
   removing the line voltage from the POTS line in an event the communications remain interrupted after the timer value is exceeded.

7. The method according to claim 6 wherein setting the timer value includes setting a fixed timer value.

8. The method according to claim 7 wherein setting the fixed timer value includes setting the fixed timer value to between about 1.5 and 3 minutes.

9. The method according to claim 6 wherein setting the timer value includes setting a configurable timer value.

10. The method according to claim 6 further including configuring the timer value to be: (i) a first value during times communications between the first PON system and the second PON system are expected to be uninterrupted and (ii) a second value during times communications between the first PON system and the second PON system are expected to be interrupted.

11. The method according to claim 6 wherein setting the timer value includes setting the timer value to a value known to be sufficient to allow the first PON system to reestablish communications with the second PON system, but not so long as to ineffectuate an alarm system coupled to the first PON system via the POTS line.

12. The method according to claim 6 further including:
   setting a timer value to less than about 30 seconds;

observing a state of light used for communications on a communications path between the first PON system and the second PON system;

triggering a timer using the timer value in an event of a loss of light on the communications path; and setting the timer value to a longer value in cases where loss of light is expected to occur.

13. The method according to claim 1 further including transmitting POTS line configuration data from the second PON system to the first PON system.

14. The method according to claim 1 further including using BPON or GPON protocols to communicate between the first PON system and the second PON system.

15. The method according to claim 1 wherein the memory is nonvolatile memory.

16. A Passive Optical Network (PON) comprising:

a first PON system including at least one Plain Old Telephone Service (POTS) line;

memory operatively coupled to or configured to store data in the first PON system, the first PON system configured to store data related to the at least one POTS line in the memory; and a second PON system operatively coupled to the first PON system, the first PON system further configured to activate the at least one POTS line based on the data from the memory in an event of interruption in communications with the second PON system prior to reestablishing communications between the first PON system and the second PON system.

17. The PON according to claim 16 wherein the first PON system is further configured to energize the at least one POTS line with a voltage based on the data prior to reestablishing communications with the second PON system in response to activating the at least one POTS line to prevent an alarm system coupled to the POTS line from generating an alarm.

18. The PON according to claim 16 wherein a reboot of the first PON system, including the at least one POTS line and memory, causes the interruption of communications between the first PON system and the second PON system.

19. The PON according to claim 18 wherein the reboot of the first PON system includes an upgrade to software in the first PON system or the second PON system.

20. The PON according to claim 16 wherein the data includes configuration data used to configure the at least one POTS line to operate as loop start or ground start on a per POTS line basis, the first PON system further configured to activate the applicable configured POTS analog interface on a per POTS line basis.

21. The PON according to claim 16 wherein the data includes a timer value that specifies a length of time the first PON system maintains a line voltage on the at least one POTS line during the interruption in communications with the second PON system, including during an interruption caused by a reboot of the second PON system, and the first PON system includes a timer that is triggered in an event of interruption in communications between the first PON system and the second PON system, the first PON system configured to remove the line voltage from the at least one POTS line in an event the communications remain interrupted after the timer value is exceeded.

22. The PON according to claim 21 further comprising an alarm system operatively coupled to the first PON system via the at least one POTS line and configured to generate an alarm in an event the communications remain interrupted after the timer value is exceeded.

23. The PON according to claim 21 wherein the timer value is a fixed value.

24. The PON according to claim 23 wherein the fixed value is between about 1.5 and 3 minutes.

25. The PON according to claim 21 wherein the timer value is a configurable value.

26. The PON according to claim 25 wherein the timer value is configured to be: (i) a first value during times communications between the first PON system and the second PON system are expected to be uninterrupted and (ii) a second value during times communications between the first PON system and the second PON system are expected to be interrupted.

27. The PON according to claim 21 wherein the timer value is known to be sufficient to allow the first PON system to reestablish communications with the second PON system, but not so long as to ineffectuate an alarm system operatively coupled to the first PON system via the at least one POTS line.

28. The PON according to claim 21 wherein the timer value is less than about 30 seconds, further comprising a light sensor operatively coupled to the first PON system and configured to observe a state of light used for communications on a communications path between the first PON system and the second PON system, the first PON system configured to trigger the timer using the timer value in an event of a loss of light on the communications path.

29. The PON according to claim 28 wherein the timer value is a longer value in cases where loss of light is expected to occur.

30. The PON according to claim 16 wherein the first PON system includes the memory.

31. The PON according to claim 16 wherein the memory is nonvolatile memory.

32. The PON according to claim 16 wherein the second PON system is configured to transmit Operations, Maintenance, and Control Interface (OMCI) data to the first PON system.

33. The PON according to claim 16 wherein the first PON system and the second PON system are configured to communicate using BPON or GPON protocols.

* * * * *

UNITED STATES PATENT AND TRADEMARK OFFICE
CERTIFICATE OF CORRECTION

PATENT NO. : 7,599,623 B2  Page 1 of 1
APPLICATION NO. : 11/352942
DATED : October 6, 2009
INVENTOR(S) : Stock et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 877 days.

Signed and Sealed this

Twenty-eighth Day of September, 2010

David J. Kappos
*Director of the United States Patent and Trademark Office*